(12) United States Patent
Francois et al.

(10) Patent No.: US 11,988,994 B2
(45) Date of Patent: May 21, 2024

(54) HOROLOGICAL COMPONENT

(71) Applicant: The Swatch Group Research and Development Ltd, Marin (CH)

(72) Inventors: Nicolas Francois, Neuchatel (CH); Agnes Marlot Doerr, Neuchatel (CH); Carole Govaerts, Les Bioux (CH)

(73) Assignee: The Swatch Group Research and Development Ltd, Marin (CH)

( * ) Notice: Subject to any disclaimer, the term of this patent is extended or adjusted under 35 U.S.C. 154(b) by 912 days.

(21) Appl. No.: 16/939,116

(22) Filed: Jul. 27, 2020

(65) Prior Publication Data

US 2021/0088973 A1 Mar. 25, 2021

(30) Foreign Application Priority Data

Sep. 23, 2019 (EP) ..................................... 19199020

(51) Int. Cl.
*G04B 19/32* (2006.01)
*C09K 11/02* (2006.01)
*G04B 45/00* (2006.01)

(52) U.S. Cl.
CPC .............. *G04B 19/32* (2013.01); *C09K 11/02* (2013.01); *G04B 45/0076* (2013.01)

(58) Field of Classification Search
CPC ............................ G04B 19/32; G04B 45/0076
See application file for complete search history.

(56) References Cited

U.S. PATENT DOCUMENTS 2,885,561 A * 5/1959 Lange .................... G04B 19/32
968/215
3,851,460 A * 12/1974 Piquerez .............. G04G 9/0041
968/215

(Continued)

FOREIGN PATENT DOCUMENTS

CN 2231802 Y 7/1996
CN 2840118 Y 11/2006
(Continued)

OTHER PUBLICATIONS

Japanese Office Action dated Jul. 27, 2021 in Japanese Patent Application No. 2020-137244 (with English translation), 15 pages.
(Continued)

*Primary Examiner* — Edwin A. Leon
*Assistant Examiner* — Jason M Collins
(74) *Attorney, Agent, or Firm* — Oblon, McClelland, Maier & Neustadt, L.L.P.

(57) ABSTRACT

A horological component including a substrate and at least one first decoration component including at least one first photoluminescent material configured to procure a phosphorescent appearance. The horological component includes a second decoration component including at least one second material, the second material being metallic and configured to procure a metallic appearance, or variochromic and configured to procure a color that varies under the effect of a stimulus, the first decoration component and the second (Continued)

decoration component being arranged relative to one another on the substrate to form a decoration having a metallic appearance or a color that varies under the effect of a stimulus when the horological component is exposed to light and a phosphorescent appearance when the horological component is in the dark. A timepiece can include such a horological component.

20 Claims, 2 Drawing Sheets

(56) References Cited

U.S. PATENT DOCUMENTS

| | | | | |
|---|---|---|---|---|
| 5,838,644 A * | 11/1998 | Yoneda | ............... | G04B 19/32 368/239 |
| 8,169,858 B2 * | 5/2012 | Klopfenstein | ......... | G04B 19/32 368/227 |
| 2004/0196742 A1 * | 10/2004 | Gouthier | ............ | G04B 19/10 368/232 |
| 2005/0056189 A1 * | 3/2005 | Decker | ............ | C09K 11/02 106/500 |
| 2010/0202255 A1 | 8/2010 | Klopfenstein et al. | | |
| 2012/0246909 A1 | 10/2012 | Kobayashi et al. | | |
| 2014/0124702 A1 * | 5/2014 | Berner | ............. | C04B 35/62655 252/301.4 F |
| 2016/0176228 A1 | 6/2016 | Dubach et al. | | |
| 2018/0072943 A1 * | 3/2018 | Higa | .................. | C08K 3/18 |
| 2018/0317616 A1 * | 11/2018 | Francois | ............. | A44C 15/004 |
| 2020/0409309 A1 * | 12/2020 | Verdon | ............... | G04B 39/002 |

FOREIGN PATENT DOCUMENTS

| | | |
|---|---|---|
| CN | 101663625 A | 3/2010 |
| CN | 202183016 U | 4/2012 |
| JP | 5-223956 A | 9/1993 |
| JP | 11-142539 A | 5/1999 |
| JP | 2004-322426 A | 11/2004 |
| JP | 2016-118537 A | 6/2016 |
| JP | 2016-170399 A | 9/2016 |
| TW | M368112 U1 | 11/2009 |
| WO | WO 2008/052989 A2 | 5/2008 |
| WO | WO 2011/078052 A1 | 6/2011 |

OTHER PUBLICATIONS

Combined Chinese Office Action and Search Report dated Aug. 25, 2021 in Chinese Patent Application No. 202011011457.4 (with English translation of Category of Cited Documents), 12 pages.
European Search Report dated Mar. 31, 2020 in European Application 19199020.9 filed Sep. 23, 2019 (with English Translation of Categories of Cited Documents), 3 pages.
Ines Dreamer, "Probando la resina Resinpro", https://youtu.be/YiP3PBJGA0E , XP054980366, Dec. 2, 2018, 8 pages.

* cited by examiner

HOROLOGICAL COMPONENT

CROSS-REFERENCE TO RELATED APPLICATION

This application claims priority to European Patent Application No. 19199020.9 filed on Sep. 23, 2019, the entire disclosure of which is hereby incorporated herein by reference.

FIELD OF THE INVENTION

The invention relates to a horological component comprising a substrate and at least one first decoration component comprising at least one first photoluminescent material intended to procure a phosphorescent appearance when the component is placed in the dark. The present invention further relates to a timepiece comprising such a component.

BACKGROUND OF THE INVENTION

The use of such a photoluminescent material for example is known for producing coatings intended to cover the hands or the indexes of a watch, so that said hands or said indexes are luminous and visible in the dark.

Swiss patent document CH 697 210 describes a dial comprising a semi-transparent layer, the rear face whereof comprises hollows filled with phosphorescent pigments allowing a decoration visible in the dark to appear beneath the semi-transparent layer.

However, even though the decorations comprising phosphorescent pigments used on a horological component are intended to be imperceptible when the decorated component is exposed to daylight, these decorations nonetheless appear, in particular to an informed professional eye. Phosphorescent decorations that show through in daylight are thus detrimental to the aesthetics of the timepiece, which is unacceptable, in particular for high-end timepieces.

SUMMARY OF THE INVENTION

The purpose of the present invention is to overcome these drawbacks by proposing a horological component comprising a photoluminescent material intended to procure a phosphorescent appearance in the dark, said photoluminescent material being concealed when the component is exposed to light, so as to improve the aesthetic appearance thereof.

For this purpose, the invention relates to a horological component comprising a substrate and at least one first decoration component comprising at least one first photoluminescent material intended to procure a phosphorescent appearance.

According to the invention, said horological component comprises a second decoration component comprising at least one second material, said second material being metallic and intended to procure a metallic appearance, or variochromic and intended to procure a colour that varies under the effect of a stimulus, said first decoration component and said second decoration component being arranged relative to one another on the substrate to form a decoration having a metallic appearance or a colour that varies under the effect of a stimulus when said component is exposed to light and a phosphorescent appearance when said component is in the dark.

Thus, when the horological component according to the invention is exposed to light, the first photoluminescent material deposited on said component disappears, leaving the metallic appearance procured by the second material.

As a result, the horological component exposed to light has an enhanced aesthetic appearance, the first non-aesthetically pleasing photoluminescent material thus being concealed, while procuring a beautiful phosphorescent appearance in the dark.

The present invention further relates to a timepiece comprising such a component.

BRIEF DESCRIPTION OF THE DRAWINGS

Other features and advantages of the invention will be better understood upon reading the following description given of different embodiments of the invention, provided solely for illustration purposes and not intended to limit the scope of the invention, and the accompanying figures, in which.

DETAILED DESCRIPTION OF THE PREFERRED EMBODIMENTS

The present invention relates to a horological component comprising a substrate and at least one first decoration component comprising at least one first photoluminescent material intended to procure a phosphorescent appearance in the dark.

Such a horological component can be a dial, a hand, an index, a bezel, a crystal, on the dial side or on the case back side, or a watch case, etc.

The substrate can be opaque or semi-transparent, or even transparent. An opaque substrate can, for example, be metallic. It can be made of brass, have a yellow or white gold base, or a silver base, or be made of any other suitable metal or alloy, that may or may not be precious.

Semi-transparent and transparent substrates can be made of glass, sapphire glass, an acrylic resin or any other suitable resin.

According to the present invention, the horological component comprises a second decoration component comprising at least one second material, said second material being metallic and intended to procure a metallic appearance, being made of mother-of-pearl or intended to procure a mother-of-pearl effect (glass particles coated in an interference layer) or variochromic and intended to procure a colour that varies under the effect of a stimulus, said first decoration component and said second decoration component being arranged relative to one another on the substrate to form a decoration having a metallic appearance or a colour that varies under the effect of a stimulus when said component is exposed to light and a phosphorescent appearance when said component is in the dark.

Preferably, the first material is made of photoluminescent pigments, preferably of the type $SrAl_2O_4:Eu^{2+}, Dy^{3+}, B^{3+}$ or $MAl_2Si_2O_8:Eu^{2+}$ (M=Ba, Sr, Ca).

In general, the content of the pigments in the first decoration component can lie in the range 1 wt % to 70 wt % with, at 1 wt % a transparent layer for the first decoration component and a low light intensity at t=5 mn in the order of 10 mCd/m² measured as per ISO standard 17514, and, at 70 wt % an opaque layer for the first decoration component and a light intensity in the order of 500 mCd/m² at t=5 mn measured as per ISO standard 17514. Ideally, the content of pigment is equal to 50 wt %, representing a compromise between a good surface finish of the first decoration component and the light intensity sought after.

In the present description, the term "metallic material" is used to describe a material that is at least partially metallic, capable of comprising non-metallic particles and metallic particles, as well as an exclusively metallic material.

According to a first alternative embodiment of the invention, the second material of the second decoration component is present in the form of particles dispersed in the second binder.

Figure 1:
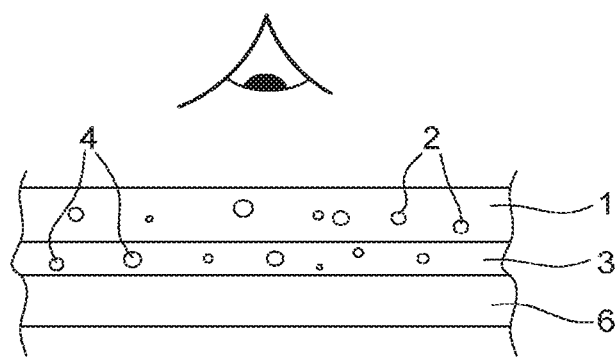
FIGS. 1 to 3 are diagrammatic sectional views of different embodiments of a first alternative embodiment of a horological component according to the present invention.

According to a first embodiment of the invention shown in FIG. 1, the decoration is a two-layer decoration, formed by a first layer that is at least semi-transparent, or that is transparent, constituting the first decoration component 1 and comprising a first binder in which photoluminescent pigments 2 are dispersed, as a first material, and by a second layer constituting the second decoration component 3 and comprising a second binder in which leafing metallised or metallic, or mother-of-pearl particles 4 or variochromic particles are dispersed, as a second material, said second layer 3 being disposed between the substrate 6 and the first layer 1 intended to be situated as close as possible to a user.

The first layer that is semi-transparent or transparent in the visible spectrum constituting the first decoration component 1 preferably has a thickness that lies in the range 0.1 mm to 2 mm.

In the specific case of the first embodiment whereby the first layer is semi-transparent or transparent, said first layer comprises between 1 wt % and 10 wt % photoluminescent pigments as defined hereinabove.

The second layer constituting the second decoration component 3 preferably has a thickness of <100 mu.

In the second layer 3, the particles are chosen so as to advantageously reflect light to make the phosphorescent particles undetectable to the eye. These are either leafing metallised or metallic particles 4, which create a mirror effect for optimal light reflection. They are advantageously made of thin metal strips having a grain size that preferably lies in the range 10 μm to 500 μm (for example aluminium, bronze, gold or silver), or of inorganic particles (aluminium oxide, silicon dioxide and borosilicates) metallised under a vacuum (for example by PVD, the different layers deposited by PVD advantageously allowing interference colours to be created, giving iridescent or mother-of-pearl appearances).

Variochromic particles are at least formed by pigments of the photochromic type or by pigments of the thermochromic type, such as spin-crossover nanoparticles.

The first layer that is at least semi-transparent constituting the first decoration component 1 whose base contains photoluminescent pigments 2 and the second layer constituting the second decoration component 3 whose base contains metallic or variochromic particles 4 are superimposed, the first layer 1 being intended to be situated as close as possible to the user. Thus, the decoration formed by the superimposition of the first and second decoration components 1, 3 has a metallic appearance or a colour that varies under the effect of a stimulus linked to the variochromic material, procured by the second decoration component 3 appearing beneath the first transparent decoration component 1 when the horological component is exposed to light, and the decoration has a phosphorescent appearance procured by the first decoration component 1 positioned as close as possible to the user, when the horological component is in the dark.

Figure 2:
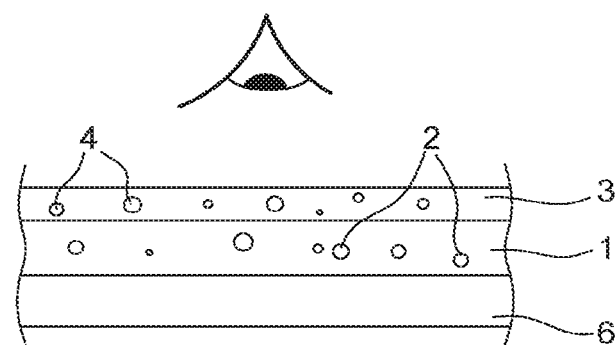

According to a second embodiment of the invention shown in FIG. 2, the decoration is a two-layer decoration, formed by a first layer constituting the first decoration component 1 and comprising a first binder in which photoluminescent pigments 2 are dispersed, as the first material, as defined hereinabove, and by a second transparent layer constituting the second decoration component 3 and comprising a second binder in which non-leafing metallised or metallic particles 4, or variochromic particles are dispersed, as the second material, said first layer 1 being disposed between the substrate 6 and the second layer 3 intended to be situated as close as possible to a user.

The first layer constituting the first decoration component 1 preferably has a thickness that lies in the range 0.1 mm to 2 mm. In this embodiment, the first layer is not necessarily transparent or semi-transparent.

The second transparent layer constituting the second decoration component 3 preferably has a thickness of <100 mu.

The non-leafing metallised or metallic particles 4 are, for example, the metallised particles described hereinabove for the first embodiment, but for which, for example, an unsaturated fatty acid was used when grinding the particles so as to modify the surface tension thereof. This further allows the particles to be better distributed in the layer and improves the abrasion resistance.

In the specific case of the second embodiment whereby the second layer 3 is transparent, said second transparent layer comprises less than 5 wt % metallised particles so as to obtain this transparency, the percentage being substantially identical for variochromic particles.

The first layer constituting the first decoration component 1 whose base contains photoluminescent pigments 2 and the second transparent layer constituting the second decoration component 3 whose base contains metallic or variochromic particles 4 are superimposed, the second layer 3 being intended to be situated as close as possible to the user. Thus, the decoration formed by the superimposition of the first and second decoration components 1, 3 has a metallic appearance or a colour that varies under the effect of a stimulus linked to the variochromic material, procured by the second decoration component 3 positioned as close as possible to the user when the horological component is exposed to light, and the decoration has a phosphorescent appearance procured by the first decoration component 1 appearing beneath the second transparent decoration component 3, when the horological component is in the dark.

Figure 3:
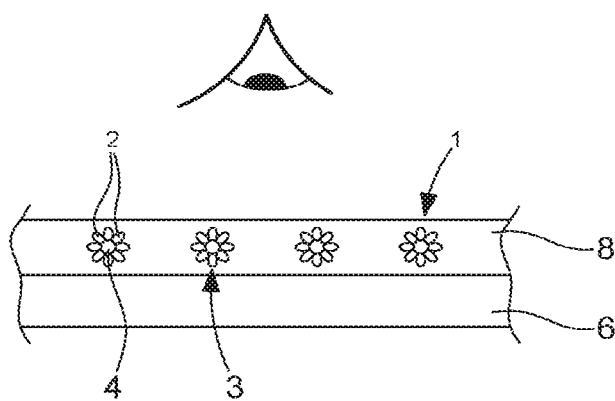

According to a third embodiment of the invention shown in FIG. 3, the decoration is a single-layer decoration, intended to be situated as close as possible to a user, and formed by a third layer 8 deposited on the substrate 6 on the user side so as to be as close to the user as possible, and comprising a third binder in which metallic or metallised particles 4 or variochromic particles are dispersed, forming the second decoration component 3 and coated with photoluminescent pigments 2 forming the first decoration component 1.

For this purpose, metallic or metallised or mother-of-pearl particles 4 or variochromic particles of the type defined hereinabove are used, the grain size whereof lies in the range 100 μm to 500 μm, and preferably in the range 100 μm to 200 μm. The photoluminescent pigments 2 of the type defined hereinabove preferably have a grain size of less than 10 μm. A dispersion of photoluminescent pigments 2 is produced in advance, comprising 5 to 30 wt % photoluminescent pigments in a polymer/solvent liquid matrix. Different methods are then possible:

the dispersion of photoluminescent pigments formed is directly sprayed onto the metallic, metallised or variochromic particles, which are spread out over a plate, then dried. The assembly is then ground by cryogenic grinding so that any particles potentially bonded to one another can be separated.

the metallic, metallised or variochromic particles are mixed in the dispersion of photoluminescent pigments, then the mixture obtained is placed in an atomiser allowing the photoluminescent pigments to quickly dry around the metallic, metallised or variochromic particles. Drying can also take place in tray dryers or by fluid bed drying, then the assembly is ground again by cryogenic grinding. The particles obtained are then dispersed in the third binder.

Another alternative requires the following preparation of the metallised or mother-of-pearl effect pigments. These pigments are coated with a thin and transparent pre-polymer film (between 20-50 microns) by a bath treatment (mixture of 80% solvent, 15% monomers, 2% hardening agents and 3% additives). The treated pigments are then mixed by friction in a ball mill with a dispersion of phosphorescent pigments.

The pigments produced by this process are then treated to finalise polymerisation (thermal curing).

The third transparent layer constituting the decoration preferably has a thickness that lies in the range 10 μm to 100 μm.

Thus, the decoration formed by said third layer has a metallic appearance or a colour that varies under the effect of a stimulus linked to the variochromic material, procured by the metallic, metallised or variochromic particles 4 appearing beneath the coating of photoluminescent pigments 2 in the third transparent layer 8 when the horological component is exposed to light, and the decoration has a phosphorescent appearance procured by the coating of photoluminescent pigments 2 formed around the metallic, metallised or variochromic particles 4, when the horological component is in the dark.

The first, second and third binders used in the first, second and third layers defined hereinabove are chosen as a function of the method for applying the corresponding layer and the transparency that the layer must have.

In particular, when one of the first or second layers must be at least semi-transparent, or must be transparent, the binder and the potential additives present in the layer are selected so as to be as transparent as possible to UV and visible radiation. An acrylate binder can be chosen for example.

The first, second and third layers comprising the associated particles dispersed in the binder can be deposited on the substrate by spraying or dipping if the entire substrate must be coated, or by screen printing if a pattern must be produced, or by pad printing for example if the substrate has a complex surface.

According to a second alternative embodiment of the invention, the substrate is at least semi-transparent, or is transparent, and the second material of the second decoration component is present in the form of a metallic film fixed by bonding for example, or formed by a vapour-phase deposition technique such as PVD or CVD. A metallic film with a lacquer can also be considered.

The metallic film is conventionally made of stainless steel, aluminium, aluminised PET or coated in a PVD gold layer.

Figure 4:
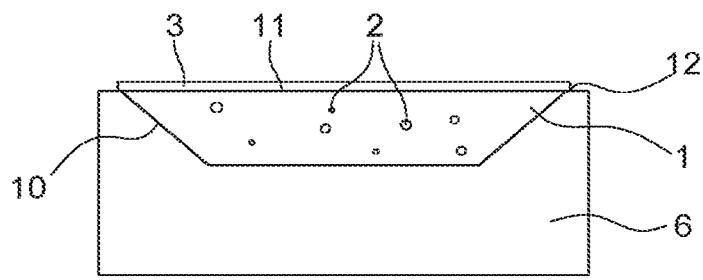
FIGS. 4 to 6 are diagrammatic sectional views of different embodiments of a second alternative embodiment of a horological component according to the present invention.
Figure 4:

According to one embodiment of the invention shown in FIG. 4, the substrate 6 is at least semi-transparent, or is transparent, and intended to be on the user side. Moreover, the decoration is formed by a first layer that is at least semi-transparent constituting the first decoration component 1 and comprising a first binder in which photoluminescent pigments 2 are dispersed as the first material, and by a second layer constituting the second decoration component 3 and constituted by a metallic film of the type such as that described with reference to the second alternative embodiment, said first layer 1 being disposed between the substrate 6 and the second layer 3, such that the first transparent layer 1 is intended to be closer to the user than the second layer 3.

Moreover, the second decoration component 3 is preferably sized so as to be substantially superimposed on the surface covered by said first decoration component 1.

The first layer that is semi-transparent or transparent constituting the first decoration component 1 preferably has a thickness that lies in the range 0.1 mm to 2 mm. It comprises between 1 wt % and 10 wt % photoluminescent pigments as described hereinabove so as to be semi-transparent or transparent.

The first layer that is at least semi-transparent constituting the first decoration component 1 whose base contains photoluminescent pigments 2 and the second layer constituting the second decoration component 3 whose base contains metallic or variochromic particles 4 are superimposed, the first layer 1 being intended to be situated closer to the user than the second layer 3. Thus, the decoration formed by the superimposition of the first and second decoration components 1, 3 has a metallic appearance or a colour that varies under the effect of a stimulus linked to the variochromic material, procured by the second decoration component 3 appearing beneath the first transparent decoration component 1 when the horological component is exposed to light, and the decoration has a phosphorescent appearance procured by the first decoration component 1 positioned as close as possible to the user, when the horological component is in the dark.

Advantageously, the substrate 6 comprises at least one recess 10 etched in the substrate, for example by laser, said recess 10 comprising at least the first decoration component 1.

Advantageously, the film constituting the second decoration component 3 is deposited by a vapour-phase deposition technique (CVD or PVD) on the surface 11 of the first decoration component 1 which comes out of the recess 10, and potentially onto a peripheral area 12 of the substrate 6. The thickness of the metallic foil conventionally lies in the range 50 μm to 100 μm.

Figure 5:
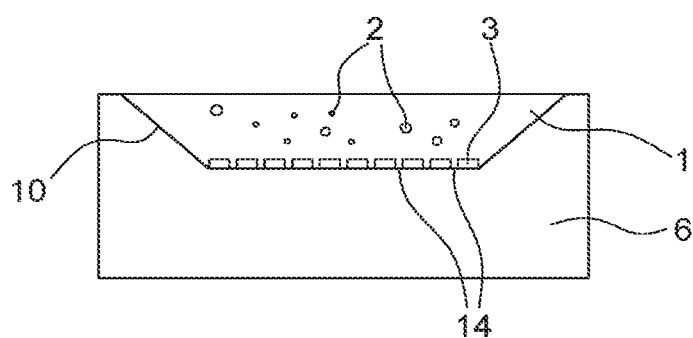
Figure 5:

According to another embodiment of the invention shown in FIG. 5, the substrate 6 is at least semi-transparent, or is transparent, and intended to be on the user side. Moreover, the decoration is formed by a first layer constituting the first decoration component 1 and comprising a first binder in which photoluminescent pigments 2 are dispersed as the first material, and by a second layer constituting the second decoration component 3 and constituted by a metallic film of the type such as that described with reference to the second alternative embodiment having perforations 14 perpendicular to the substrate 6, said second layer 3 being disposed between the substrate 6 and the first layer 1, such that the second layer 3 with the perforations is intended to be closer to the user than the first layer 1.

The perforations, having a diameter of 100 μm to 200 μm 14 in the metallic or variochromic film are preferably made by laser after the deposition of the metallic or variochromic film, for example by a vapour-phase deposition technique (CVD or PVD) on the substrate 6. The thickness of the metallic foil conventionally lies in the range 50 μm to 100 μm. Moreover, the second decoration component 3 is preferably sized so as to be substantially superimposed on the surface covered by said first decoration component 1.

Advantageously, the substrate 6 comprises at least one recess 10 etched in the substrate, for example by laser, at the bottom whereof the perforated metallic or variochromic film constituting the second decoration component 3 is deposited, said recess being filled with the first layer constituting the first decoration component 1.

Advantageously, in particular if the first decoration component 1 occupies, on the substrate, a surface area greater than that occupied by the second decoration component 1, the first layer constituting the first decoration component is preferably semi-transparent, or is transparent, as described in detail hereinabove.

The first layer constituting the first decoration component 1 whose base contains photoluminescent pigments 2 and the second layer constituting the second decoration component 3 whose base contains metallic or variochromic particles 4 are superimposed, the second layer 3 being intended to be situated closer to the user than the first layer 1. Thus, the decoration formed by the superimposition of the first and second decoration components 1, 3 has a metallic appearance or a colour that varies under the effect of a stimulus linked to the variochromic material, procured by the second decoration component 3 positioned as close as possible to the user when the horological component is exposed to light, and the decoration has a phosphorescent appearance procured by the first decoration component 1 appearing through the perforations 14 of the second decoration component 3, when the horological component is in the dark.

Figure 6:
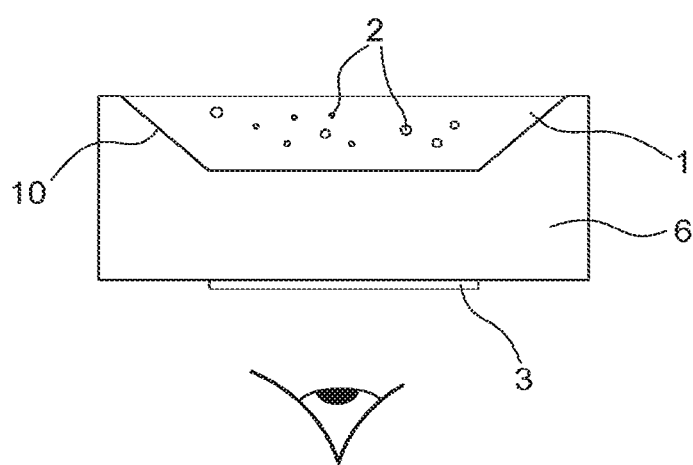
Figure 6:

According to another embodiment of the invention shown in FIG. 6, the substrate 6 is at least semi-transparent, or is transparent, and intended to be on the user side. Moreover, the decoration is formed by a first layer that is at least semi-transparent constituting the first decoration component 1 and comprising a first binder in which photoluminescent pigments 2 are dispersed as the first material, and by a second layer constituting the second decoration component 3 and constituted by a metallic film of the type such as that described with reference to the second alternative embodiment, said second layer 3 being disposed on the substrate 6 on the user side, said first layer 1 being deposited on the substrate 6, on the opposite side to the second layer 3, the dimensions of the surface area occupied by the second decoration component on the substrate 6 being less than the dimensions of the surface area of the first decoration component 1 so as to be able to create a phosphorescent halo around the second decoration component 3 when the horological component is in the dark.

Advantageously, the substrate 6 comprises at least one recess 10 etched in the substrate, for example by laser, opening out onto the face opposite the second decoration component 3, and filled with the first layer constituting the first decoration component 1.

Advantageously, the film constituting the second decoration component 3 is deposited by a vapour-phase deposition technique (CVD or PVD) on the surface of the substrate 6 so as to be as close as possible to the user.

The first layer constituting the first decoration component 1 whose base contains photoluminescent pigments 2 and the second layer constituting the second decoration component 3 whose base contains metallic or variochromic particles 4 are superimposed, the second layer 3 being intended to be situated closer to the user than the first layer 1. Thus, the decoration formed by the superimposition of the first and second decoration components 1, 3 has a metallic appearance or a colour that varies under the effect of a stimulus linked to the variochromic material, procured by the second decoration component 3 positioned as close as possible to the user when the horological component is exposed to light, and the decoration has a phosphorescent halo procured by the first decoration component 1 appearing at the periphery of the second decoration component 3, when the horological component is in the dark.

The invention claimed is:

1. A horological component, comprising:
   a substrate;
   a first decoration component comprising a first photoluminescent material configured to procure a phosphorescent appearance; and
   a second decoration component comprising a second material, the second material being metallic and configured to procure a metallic appearance, or variochromic and configured to procure a color that varies under the effect of a stimulus,
   wherein the first decoration component and the second decoration component are arranged relative to one another on the substrate to form a decoration having a metallic appearance or a color that varies under the effect of a stimulus when the horological component is exposed to light and a phosphorescent appearance when the horological component is in the dark,
   wherein the decoration is a two-layer decoration, formed by
   (i-a) a first layer that is at least semi-transparent, constituting the first decoration component and comprising a first binder in which photoluminescent pigments are dispersed, as a first material, and (ii-a) a second layer constituting the second decoration component and comprising a second binder in which leafing metallized or metallic particles or variochromic particles are dispersed, as a second material, or
   (i-b) a first layer constituting the first decoration component and comprising a first binder wherein photoluminescent pigments are dispersed, as a first material, and (ii-b) a second transparent layer constituting the second decoration component and comprising a second binder in which non-leafing metallized or metallic particles or variochromic particles are dispersed, as a second material, and
   wherein the second layer (ii-a) is disposed between the substrate and the first layer (i-a), such that the first layer (i-a) is situated closer to a user than the second layer (ii-a), or
   wherein the first layer (i-b) is disposed between the substrate and the second layer (ii-b), such that the second layer (ii-b) is situated closer to a user than the first layer (i-b).

2. The component of claim 1, wherein the second layer (ii) is disposed between the substrate and the first layer (i), such that the first layer (i) is situated closer to a user than the second layer (ii).

3. The component of claim 2, wherein the first layer (i) is transparent and comprises the photoluminescent pigments in a range of from 1 to 10 wt. %, based on total first layer weight.

4. The component of claim 1, wherein the first layer (i-b) is disposed between the substrate and the second layer (ii-b), such that the second layer (ii-b) is situated closer to a user than the first layer (i-b).

5. The component of claim 4, wherein the second layer (ii) comprises less than 5 wt % metallized particles or less than 0.5 wt % variochromic particles so as to preserve a degree of semi-transparency.

6. The component of claim 1, wherein the substrate is opaque.

7. A horological component, comprising:
a substrate;
a first decoration component comprising a first photoluminescent material configured to procure a phosphorescent appearance; and
a second decoration component comprising a second material, the second material being metallic and configured to procure a metallic appearance, or variochromic and configured to procure a color that varies under the effect of a stimulus,
wherein the first decoration component and the second decoration component are arranged relative to one another on the substrate to form a decoration having a metallic appearance or a color that varies under the effect of a stimulus when the horological component is exposed to light and a phosphorescent appearance when the horological component is in the dark,
wherein the substrate is at least semi-transparent and configured to be on a user side, and
wherein the decoration is formed by
(i-a) a first layer that is at least semi-transparent, constituting the first decoration component and comprising a first binder in which photoluminescent pigments are dispersed as the first material, and (ii-a) a second layer, constituting the second decoration component and comprising a metallic film or mother-of-pearl/iridescent film or variochromic film, or
(i-b) a first layer that is at least semi-transparent, constituting the first decoration component and comprising a first binder in which photoluminescent pigments are dispersed as the first material, and (ii-b) a second layer constituting the second decoration component and constituted by a metallic film or mother-of-pearl/iridescent film or variochromic film,
wherein the first layer (i-a) is disposed between the substrate and the second layer (ii-a), such that the first layer (i-a) is closer to the user than the second layer (ii-a), or
wherein the first layer (i-b) is deposited on the substrate, on an opposite side of the substrate to the second layer (ii-b), the dimensions of the second decoration component being less than dimensions of the first decoration component so as to be able to create a phosphorescent halo around the second decoration component.

8. The component of claim 7, wherein the decoration is formed by
(i-a) the first layer that is at least semi-transparent, constituting the first decoration component and comprising the first binder in which photoluminescent pigments are dispersed as the first material, and
(ii-a) the second layer, constituting the second decoration component and comprising the metallic film or mother-of-pearl/iridescent film or variochromic film,
wherein the first layer (i-a) is disposed between the substrate and the second layer (ii-a), such that the first layer (i-a) is closer to the user than the second layer (ii-a).

9. The component of claim 7, wherein the decoration is formed by
(i-b) the first layer that is at least semi-transparent, constituting the first decoration component and comprising the first binder in which photoluminescent pigments are dispersed as the first material, and
(ii-cb) the second layer, constituting the second decoration component and constituted by the metallic film or mother-of-pearl/iridescent film or variochromic film,
wherein the second layer (ii-b) is disposed on the substrate on the user side,
wherein the first layer (i-b) is deposited on the substrate, on an opposite side of the substrate to the second layer (ii-b), and
wherein dimensions of the second decoration component are less than dimensions of the first decoration component so as to be able to create the phosphorescent halo around the second decoration component.

10. The component of claim 7, wherein the metallic film is present and is a fixed metallic plate or a metallic layer deposited by a vapor-phase deposition technique.

11. The component of claim 1, wherein the substrate comprises a recess comprising the first decoration component.

12. The component of claim 1, wherein the variochromic material is present and comprises a photochromic pigment or a thermochromic pigment.

13. A timepiece, comprising the horological component of claim 1.

14. The component of claim 1, wherein the first or second layer has perforations perpendicular to the substrate.

15. The component of claim 1, wherein the first material comprises $SrAl_2O_4$:M, M being $Eu^{2+}$, $Dy^{3+}$, or $B^{3+}$, or
wherein the first material comprises $MAl_2Si_2O_8$:$EU^{2+}$, M being Ba, Sr, or Ca.

16. The component of claim 1, wherein the substrate is at least semi-transparent.

17. A horological component, comprising:
a substrate;
a first decoration component comprising a first photoluminescent material configured to procure a phosphorescent appearance; and
a second decoration component comprising a second material, the second material being metallic and configured to procure a metallic appearance, or variochromic and configured to procure a color that varies under the effect of a stimulus,
wherein the first decoration component and the second decoration component are arranged relative to one another on the substrate to form a decoration having a metallic appearance or a color that varies under the effect of a stimulus when the horological component is exposed to light and a phosphorescent appearance when the horological component is in the dark, and
wherein the horological component comprises no hollows between the substrate and an outer layer of the horological component.

18. The component of claim 17, wherein the decoration is a single-layer decoration, configured to be situated as an outermost layer with respect to a user, and formed by a single decoration layer comprising a single decoration layer binder in which metallic or metallized particles or mother-of-pearl/iridescent or variochromic particles are dispersed, forming the second decoration component, and coated with photoluminescent pigments, forming the first decoration component.

19. The component of claim 17, having only flat layer interfaces.

20. The component of claim 17, wherein the particles are metal strips or metallized inorganic particles having a grain size in a range of from 10 to 500 μm, wherein the metal strips comprise aluminum, bronze, gold, or silver, or wherein the metallized inorganic particles comprise aluminum oxide, silicon dioxide, and borosilicate.

* * * * *